United States Patent
Togami

(10) Patent No.: US 8,228,518 B2
(45) Date of Patent: Jul. 24, 2012

(54) IMAGE PROCESSING APPARATUS, IMAGE PROCESSING METHOD, AND COMPUTER PROGRAM PRODUCT

(75) Inventor: Atsushi Togami, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 688 days.

(21) Appl. No.: 12/379,023

(22) Filed: Feb. 11, 2009

(65) Prior Publication Data

US 2009/0213396 A1 Aug. 27, 2009

(30) Foreign Application Priority Data

Feb. 26, 2008 (JP) .................................. 2008-044542

(51) Int. Cl.
*H04N 1/40* (2006.01)
(52) U.S. Cl. ..................... 358/1.13; 358/1.18; 358/2.1
(58) Field of Classification Search .............. 358/1.13, 358/1.18, 1.9, 2.1, 1.6, 468, 3.27, 527
See application file for complete search history.

(56) References Cited

U.S. PATENT DOCUMENTS

| 5,884,120 A | 3/1999 | Ito et al. |
| 7,002,709 B1 | 2/2006 | Terada et al. |
| 2004/0095587 A1 | 5/2004 | Brown et al. |

FOREIGN PATENT DOCUMENTS

| EP | 1 467 556 | 10/2004 |
| JP | 09-138608 | 5/1997 |
| JP | 3772610 | 2/2006 |
| JP | 3983101 | 7/2007 |

OTHER PUBLICATIONS

European Search Report dated Oct. 30, 2009 for corresponding European Application No. 09250415.8.
Abstract for JP 2003-046772 published on Feb. 14, 2003.
Abstract for JP 2001-127989 published on May 11, 2001.

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An image determining unit determines a type of each of a plurality of images to be combined. A character identifying unit identifies a black character area in each of the images. A color-conversion processing unit performs a color conversion or a monochrome conversion on the images and a monochrome conversion on the black character area. When the images include a color image, a control unit controls the color-conversion processing unit to perform the color conversion on the images based on the type of the image and a current image processing mode. An image output unit combines color-conversion processed images on a single page and outputs combined images.

9 Claims, 10 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2008-044542 filed in Japan on Feb. 26, 2008.

BACKGROUND OF THE INVENTION

1. Field of the Invention

The present invention relates to a technology for enhancing image quality at low image forming cost when more than one page of image data is output on a single page in a combined manner.

2. Description of the Related Art

Typically, from the perspective of image quality or image forming cost, an image processing apparatus such as a copier, a printer, or a multifunction product (MFP) determines whether an original is a color original (i.e., an original having color image data) or a monochrome original (i.e., an original having monochrome image data) and, if the original is determined to be a monochrome original, outputs image data in monochrome. For example, Japanese Patent Application Laid-open No. H9-138608 discloses an image forming apparatus that, depending on the number of color originals in the total number of originals to be output and the user setting, selects a color image-forming mode or a black-and-white (B&W) image-forming mode.

Typically, an image processing apparatus outputs a single image or a plurality of images in a combined manner on a single page. Normally, in the case of one-to-one copying (i.e., copying with identical magnification), a monochrome original is not subjected to color output because the image forming cost for color output is higher than the image forming cost for monochrome output. However, consider a case of two-in-one output (i.e., two pages of image data is combined on a single page) or four-in-one output (i.e., four pages of image data is combined on a single page). In that case, if the originals to be combined include at least one color original, then the originals are subjected to color output and the image forming cost is determined according to the color output.

Japanese Patent No. 3772610 discloses an image forming apparatus that uses halftone dots for determining whether an image data in an original is color image data or monochrome image data, and always outputs monochrome image data in monochrome to enhance the image quality of the combined image data. To perform monochrome output, RGB-to-CMYK conversion (or RGB-to-K conversion) is used such that the final output is in black only. Meanwhile, RGB stands for a color model of red, blue, and green; while CMYK stands for a color model of cyan, magenta, yellow, and black.

However, there is still room for enhancing the image quality at lower image forming cost.

Conventionally, originals determined to be monochrome (B&W) originals are always output in monochrome. That rules out the option of subjecting the monochrome originals to color output for obtaining high-quality monochrome reproduction. Thus, that leaves room for enhancement in the image quality. Moreover, consider a case of combining image data of a plurality of originals on a single page. In that case, even if only one color original is present in the originals to be combined, then all the originals can be subjected to color output and the image forming cost is determined according to the color output. However, the factors such as the image quality and the image forming cost while performing the color output have not been given due consideration in conventional techniques.

In recent times, image processing functionalities such as black character identification have improved vastly. For example, a technology has been developed in which, even if image portion in a monochrome original is output in full-color, character portion is output in a single color output such as black. Moreover, depending on the type or the usage of a monochrome original, sometimes it is desirable not to subject that original to monochrome output. For example, instead of performing monochrome output, if a monochrome original having a picture is reproduced in grayscale using four colors by performing color output, then it becomes possible to ensure proper image density, granularity, and gloss in the output image. Furthermore, to reproduce a high-quality monochrome image, many users are not content with the black color of toner or ink. Such users like to simulate a particular black color with combination of CMYK.

FIG. 10 is a diagram for explaining a conventional technique to combine three originals having monochrome characters and one original having color characters and a monochrome picture on a single page (four-in-one output). In that case, based on an original-type identification result, the three originals having monochrome characters are determined to be monochrome originals; while the remaining original is determined to be a color original. When those four originals are combined on a single page, the image data corresponding to the three monochrome originals is output in monochrome; while the color characters in the color original are output in color and the monochrome picture in the color original is output in grayscale using four colors.

FIG. 11 is a diagram for explaining a conventional technique to combine one original having monochrome characters, two originals having a monochrome picture and monochrome characters, and one original having color characters and a monochrome picture on a single page (four-in-one output). In that case, based on an original-type identification result, only the original having color characters (bottom right original in FIG. 11) is determined to be a color original; while the remaining three originals are determined to be monochrome originals. When those four originals are combined, then all the monochrome originals are output in monochrome; while the monochrome picture in the color original is output in grayscale using four colors and the color characters in the color original are output as color text.

In this way, conventionally, reproduction in grayscale using four colors image is performed only with respect to a color original. That results in a lack of uniformity in the combined output. Moreover, the monochrome reproduction results in relatively low image quality such as poor image density, poor granularity, or less gloss. Furthermore, generally, conventional techniques of combining image data take into consideration only the case of outputting image data on paper. However, with the recent advancement in networking, it is also necessary to take into consideration facsimile transmission or distribution of combined image data over the network.

While determining the output mode (color output or monochrome output) for image data based on an original-type identification result, it is necessary to take into consideration not only the combined image data but also the image forming cost with respect to each output mode. Generally, when all the originals to be combined are determined to be monochrome originals, then each original is output in a monochrome manner because the image forming cost is less than that of color output. However, if there is not a substantial difference in the image forming cost of monochrome output and the image forming cost of color output, then color output should be taken into consideration for enhancing the image quality.

SUMMARY OF THE INVENTION

It is an object of the present invention to at least partially solve the problems in the conventional technology.

According to one aspect of the present invention, there is provided an image processing apparatus having a plurality of image processing modes and outputting images of a plurality of pages on a single page in a combined manner. The image processing apparatus includes an image determining unit that determines whether each of the images is a color image or a monochrome image; a character identifying unit that identifies a black character area in each of the images; a color-conversion processing unit that performs either one of a color conversion and a monochrome conversion on each of the images and a monochrome conversion on the black character area; a mode identifying unit that identifies a current image processing mode; a control unit that, when the image determining unit determines that the images include a color image, controls the color-conversion processing unit to perform the color conversion on the images based on a result of determination by the image determining unit and the current image processing mode; and an image output unit that combines the images on which the color conversion is performed by the color-conversion processing unit on a single page and outputs combined images.

Furthermore, according to another aspect of the present invention, there is provided a method of outputting images of a plurality of pages on a single page in a combined manner. The method includes determining whether each of the images is a color image or a monochrome image; identifying a black character area in each of the images; performing either one of a color conversion and a monochrome conversion on each of the images and a monochrome conversion on the black character area; identifying a current image processing mode; causing, when it is determined that the images include a color image at the determining, the color conversion to be performed on the images based on a result of determination at the determining and the current image processing mode; and image outputting including combining the images on which the color conversion is performed on a single page and outputting combined images.

Moreover, according to still another aspect of the present invention, there is provided a computer program product including a computer-usable medium having computer-readable program codes embodied in the medium for outputting images of a plurality of pages on a single page in a combined manner. The program codes when executed cause a computer to execute determining whether each of the images is a color image or a monochrome image; identifying a black character area in each of the images; performing either one of a color conversion and a monochrome conversion on each of the images and a monochrome conversion on the black character area; identifying a current image processing mode; causing, when it is determined that the images include a color image at the determining, the color conversion to be performed on the images based on a result of determination at the determining and the current image processing mode; and image outputting including combining the images on which the color conversion is performed on a single page and outputting combined images.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments. Moreover, not all of the constituent elements explained in the exemplary embodiments are mandatory constituent elements.

Figure 1:
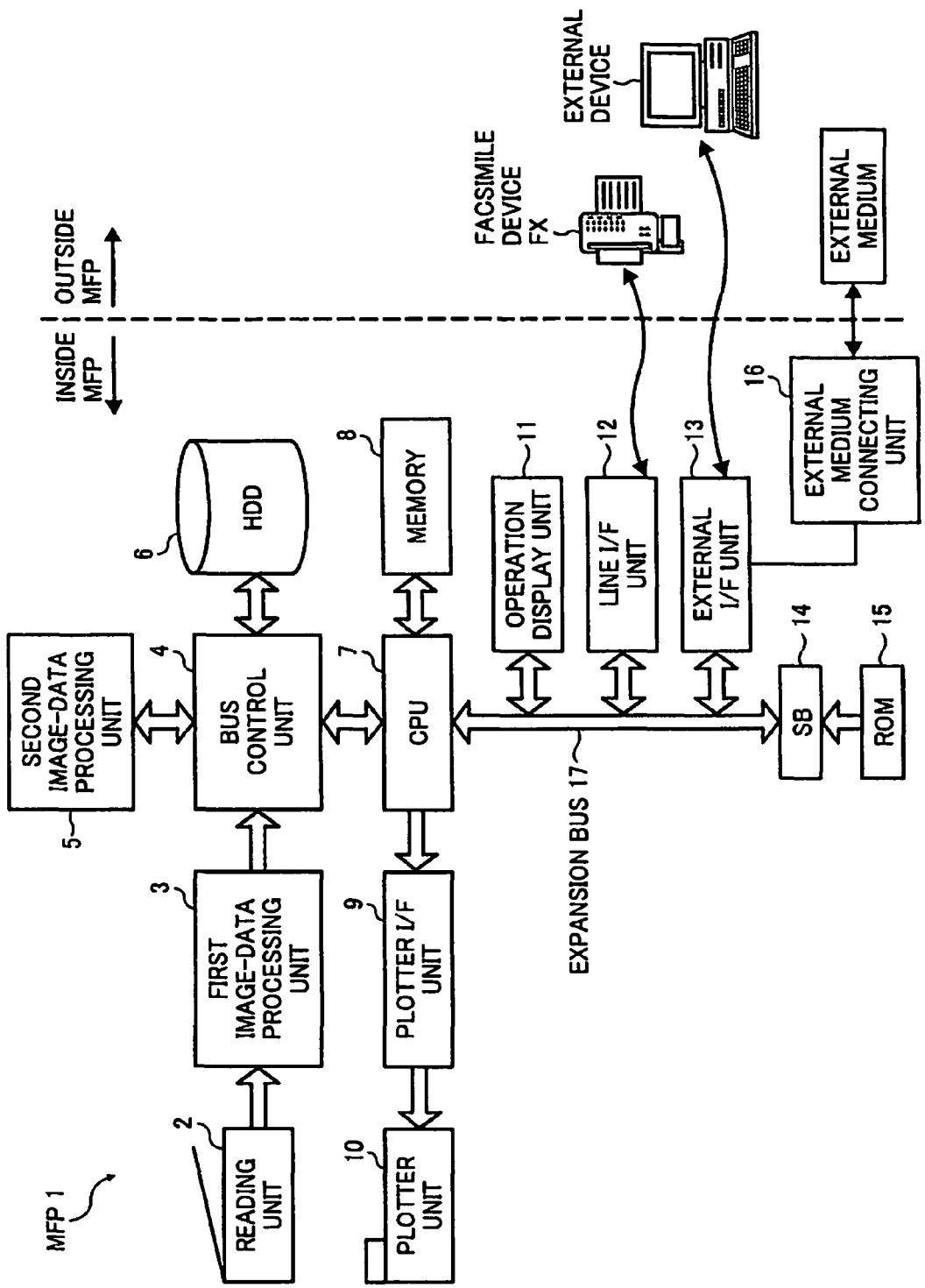
FIG. 1 is a block diagram of a multifunction product (MFP) according to an embodiment of the present invention.

FIGS. 1 to 9 are diagrams for explaining an image processing apparatus, an image processing method, and an image processing computer program product according to an embodiment of the present invention. FIG. 1 is a block diagram of an MFP 1 according to the embodiment.

The MFP 1 includes a reading unit 2, a first image-data processing unit 3, a bus control unit 4, a second image-data processing unit 5, a hard disk drive (HDD) 6, a central processing unit (CPU) 7, a memory 8, a plotter interface (I/F) unit 9, a plotter unit 10, an operation display unit 11, a line I/F unit 12, an external I/F unit 13, a south bridge (SB) 14, a read only memory (ROM) 15, and an external-medium connecting unit 16.

The reading unit 2 includes, e.g., a line image sensor that uses charge coupled devices (CCDs), an analog-to-digital (A/D) converting circuit, and a driving circuit that drives the reading unit 2. Generally, the reading unit 2 is equipped with an automatic document feeder (ADF) in which a plurality of originals can be set for reading. The ADF feeds one original at a time to an original reading position in the reading unit 2. Subsequently, the reading unit 2 scans the fed original in a main scanning direction and in a sub-scanning direction, reads an image on the original at a predetermined resolution based on image density information of the original, generates digital image data of predetermined bits (e.g., 8 bits) of RGB color model, and sends the RGB image data to the first image-data processing unit 3. Meanwhile, instead of using the CCDs, the reading unit 2 can also be configured to use a contact image sensor (CIS) or a complementary metal oxide semiconductor (CMOS) for reading originals. The first image-data processing unit 3 performs image processing of the digital image data output by the reading unit 2 such that the image data possesses predetermined characteristics. The predetermined characteristics of the image data provided by the first image-data processing unit 3 vary according to the destination to which the image data stored in the MFP 1 is to be sent for further processing. The details of the predetermined characteristics of the image data are given later.

The bus control unit 4 controls the functioning of data buses that are used for the communication of a variety of information such as image data or control commands inside the MFP 1. The bus control unit 4 also has a bridge function with respect to various types of bus standards. More particularly, the bus control unit 4 is configured as an application specific integrated circuit (ASIC) that is connected to the first image-data processing unit 3, the second image-data processing unit 5, and the CPU 7 by a PCI-Express bus (PCI stands for peripheral component interconnect); while connected to the HDD 6 by an advanced technology attachment (ATA) bus.

The second image-data processing unit 5 receives the digital image data having predetermined characteristics provided by the first image-data processing unit 3 or receives image data input via either one of the line I/F unit 12 and the external I/F unit 13, and performs image adjustment/processing or image processing suitable to a user-specified destination of the received image data. The image processing performed by the second image-data processing unit 5 is described later in detail.

The HDD 6 is a high-capacity storage medium also used in personal computers (PCs). The digital image data and the accompanying information is stored in the HDD 6. Moreover, the HDD 6 is equipped with ATA connection, which is a standardized expansion of an integrated development environment (IDE) interface. Meanwhile, as a high-capacity storage medium in the MFP 1, it is also possible to use a silicon disk that includes a flash memory, which in recent years is manufactured to have large storage capacity.

The CPU 7 is a microprocessor that controls operations of the MFP 1. The CPU 7 is an integrated CPU in which a CPU core unit, which has become popular in recent years, is equipped with an integrated connection facility for a common standard I/F or equipped with an integrated bus connection facility using a crossbar switch.

The memory 8 is a fast-access and volatile memory used to temporarily store data that is temporarily communicated to absorb the speed difference in the case of bridging a plurality of bus standards or temporarily communicated to absorb the difference in processing speed of a connected device. In addition, the memory 8 is used to temporarily store software programs or intermediary processing data used when the CPU 7 controls the operations of the MFP 1. To enable high-speed processing in the MFP 1, the CPU 7 boots the system of the MFP 1 by using a boot program stored in the ROM 15, performs fast access to software programs stored in the memory 8, and executes the software programs for further processing. In the MFP 1, a standardized dual-in-line memory (DIMM), which is also installed in PCs, is used as the memory 8.

The plotter I/F unit 9 receives digital image data of CMYK via the standard I/F integrated in the CPU 7. Subsequently, the plotter I/F unit 9 performs bus-bridge processing and sends the image data to a dedicated I/F for the plotter unit 10. Meanwhile, a PCI-Express bus is used as the standard I/F integrated in the CPU 7.

The plotter unit 10 performs an electrophotographic process on the CMYK digital image data by using a laser beam and outputs images in that image data on a recording medium. However, instead of using the electrophotographic process for image formation, the plotter unit 10 can also be configured to use another image forming process such as an ink-jet image forming process.

The SB 14 is one of the chips used in a northbridge/southbridge chipset architecture. The SB 14 has a standardized bridge function for buses such as an expansion bus 17 of PCI-Express standard and an industrial standard architecture (ISA) bus that are used to configure a CPU system having bridge function. In the MFP 1, the SB 14 bridges the CPU 7 to the ROM 15.

The ROM 15 is used to store basic programs of the MFP 1, an image processing program described later in detail, and necessary system data. Based on the software programs stored in the ROM 15, the CPU 7 controls operations such as basic operations and image processing operations of the MFP 1. While controlling the operations of the MFP 1, the CPU 7 uses the memory 8 as a work memory.

The operation display unit 11 is a user interface having a user display (e.g., a liquid crystal display (LCD)) and key switches. The operation display unit 11 is connected to the CPU 7 via the expansion bus 17 of PCI-Express standard. Under the control of the CPU 7, the operation display unit 11 displays information about different states of the MFP 1 or various operational methods on the user display and detects key-switch input operations performed by users.

The line I/F unit 12 is used to connect the expansion bus 17 of PCI-Express standard to a telephone line. That enables the MFP 1 to communicate data with external telecommunication devices such as a facsimile device FX.

The external I/F unit 13 is used to connect the expansion bus 17 of PCI-Express standard to an external device and enables data communication therebetween. For example, the external I/F unit 13 can be connected to a network such as Ethernet (registered trademark) that includes the external device. Moreover, the external I/F unit 13 is also connected to an external medium via the external-medium connecting unit 16 such as a universal serial bus (USB). A typical example of the external device is a PC. In that case, a user can use an application program or a driver installed in the PC to control the operations of the MFP 1 or to perform input-output of data with respect to the MFP 1. An example of the external medium is a memory device such as a Compact Flash (registered trademark) card or a secure digital (SD) card that is used to store digital data such as image data. Thus, the external I/F unit 13 enables communication of image data between the MFP 1 and the external medium.

Figure 2:
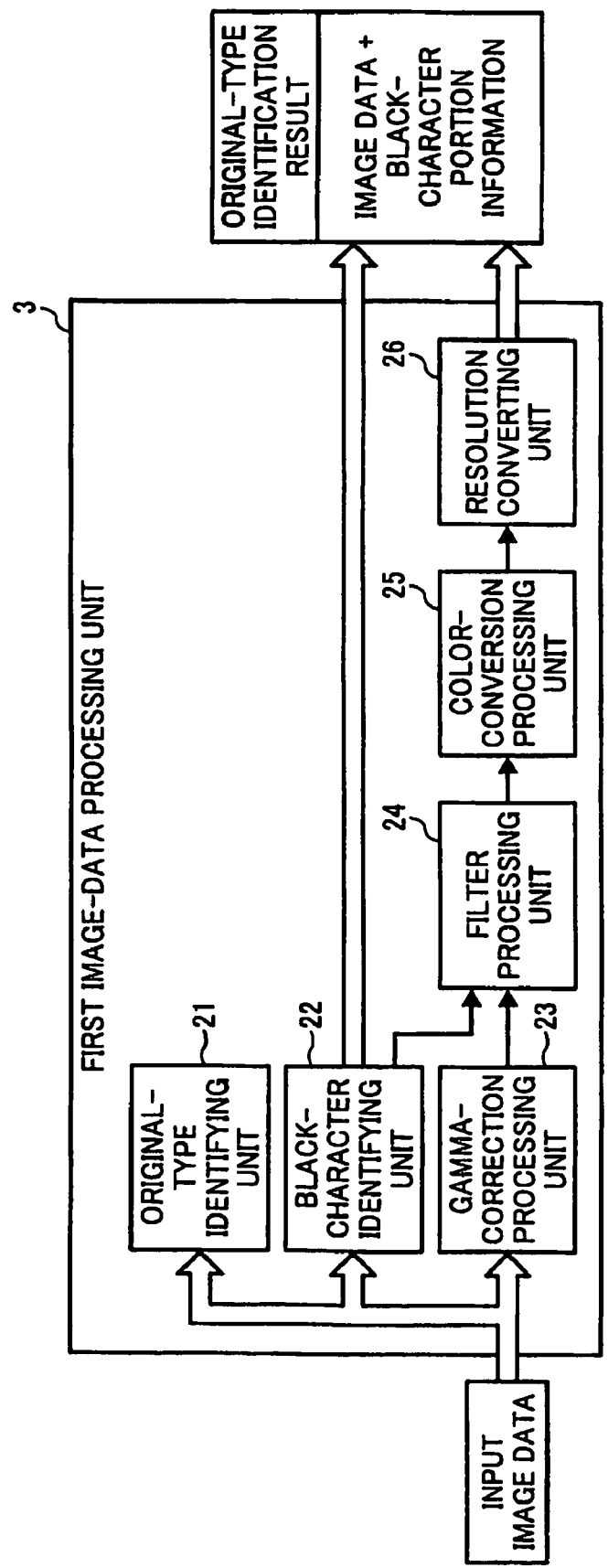
FIG. 2 is a block diagram of an exemplary configuration of a first image-data processing unit in the MFP.

FIG. 2 is a block diagram of an exemplary configuration of the first image-data processing unit 3. As shown in FIG. 2, the first image-data processing unit 3 includes an original-type identifying unit 21, a black-character identifying unit 22, a gamma-correction processing unit 23, a filter processing unit 24, a color-conversion processing unit 25, and a resolution converting unit 26. In the first image-data processing unit 3, each of the original-type identifying unit 21, the black-character identifying unit 22, and the gamma-correction processing unit 23 performs image processing of the image data received from the reading unit 2 whereby the processed image data possesses predetermined characteristics. The first image-data processing unit 3 then sends the processed image data to the bus control unit 4. Moreover, in the first image-data processing unit 3, original-type identification result is obtained from the received image data.

The black-character identifying unit 22 identifies portions of black characters from the received digital image data under characteristics based on reflectivity property. Subsequently, the black-character identifying unit 22 appends black-character portion information to the image data and sends the appended image data to a subsequent processing block as well as to the filter processing unit 24. The black-character identifying unit 22 can be configured to identify portions of black-characters by using any known technique (see, for example, Japanese Patent No. 3983101).

Figure 3:
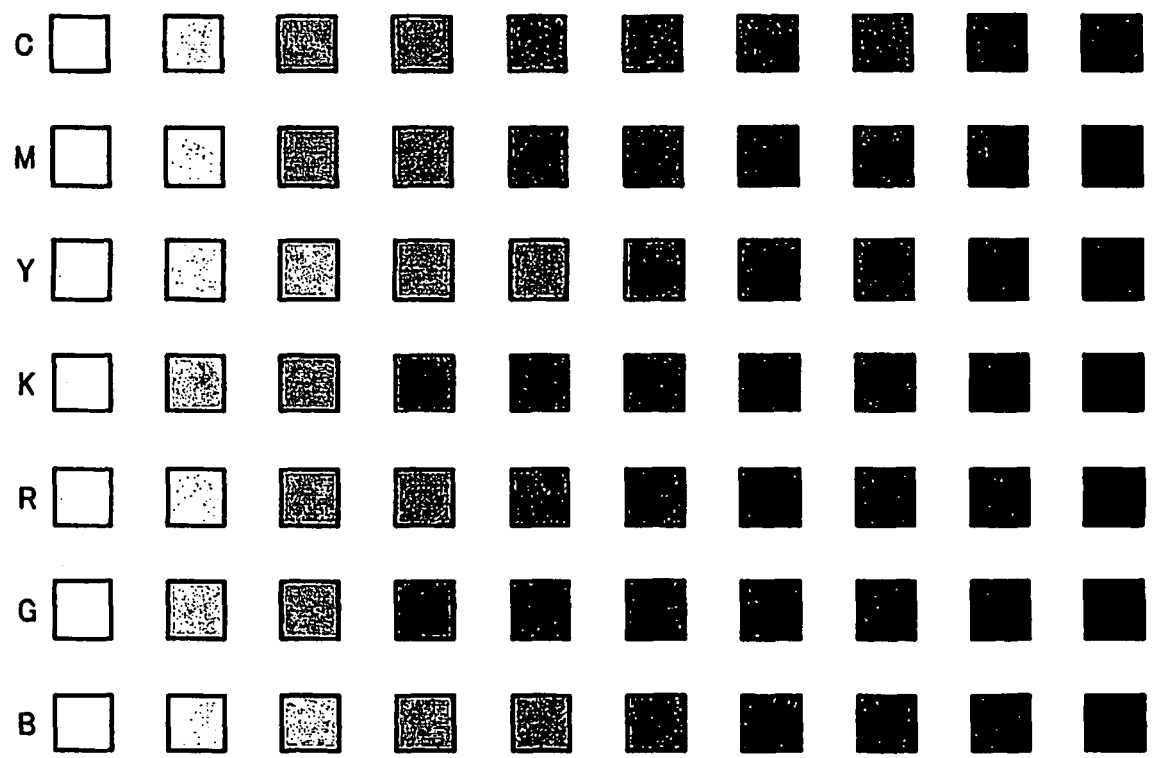
FIG. 3 is an exemplary chart for gamma characteristics correction used by a gamma-correction processing unit shown in FIG. 2.

The gamma-correction processing unit 23 performs gamma correction of the image data received from the reading unit 2 and converts the image data from having characteristics based on reflectivity property to have predetermined gamma characteristics (e.g., $\gamma=2.2$). Particularly, when the reading unit 2 scans a chart for gamma characteristics correction as shown in FIG. 3, the gamma-correction processing unit 23 performs gamma correction of the image data to obtain image data having predetermined gamma characteristics.

Figure 4:
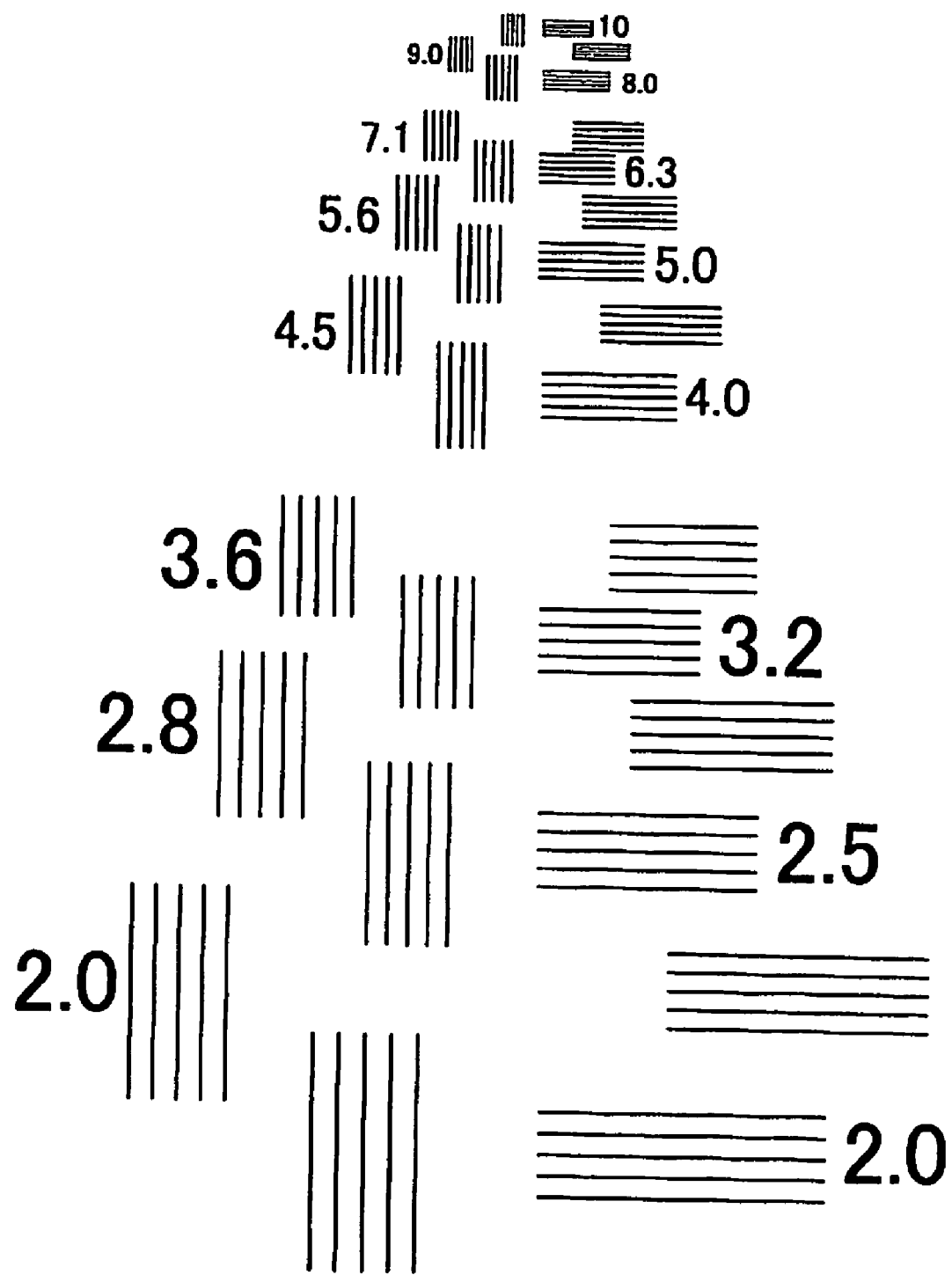
FIG. 4 is an exemplary standard chart used for filter processing by a filter processing unit shown in FIG. 2.

The filter processing unit 24 performs predetermined filter processing on gamma-corrected image data and corrects modulation transfer function (MTF) characteristics of the reading unit 2 to predetermined characteristics. More particularly, when the reading unit 2 scans patterns of a standard chart as shown in FIG. 4, the filter processing unit 24 converts scan lines per inch to predetermined MTF characteristic values Moreover, based on the black-character portion information, the filter processing unit 24 varies the processes performed by the second image-data processing unit 5.

The color-conversion processing unit 25 converts the color space of the reading unit 2 to a predetermined color space. It is desirable that the color space in the color-conversion processing unit 25 is sufficiently large with respect to the image data received from the reading unit 2 such that the image data is not clipped or compressed. However, if the color space in the color-conversion processing unit 25 is too large, then problem might occur in gradation adjustment. Thus, in the MFP 1, when the reading unit 2 scans a chart as shown in FIG. 3, the color-conversion processing unit 25 converts the color space to AdobeRGB, which is one of the standardized color spaces.

The resolution converting unit 26 converts the resolution of the image data received from the reading unit 2 to a predetermined resolution of, although not limited to, 600 dots per inch (dpi).

In this way, the first image-data processing unit 3 provides predetermined characteristics to the image data and sends that image data as well as the black-character portion information to the bus control unit 4.

In parallel with the process of providing predetermined characteristics to the image data received from the reading unit 2, the original-type identifying unit (image identifying unit) 21 in the first image-data processing unit 3 performs auto color select (ACS) processing to determine whether the image data received from the reading unit 2 is image data on a color original or image data on a monochrome original, and obtains original-type identification result regarding the image data. It is possible to use any known technique for original type identification (see, for example, Japanese Patent No. 3983101). The image data and the corresponding original-type identification result can be sent to various data buses.

However, in the MFP 1, the CPU 7 reads only the original-type identification result after ACS processing is performed with respect to each frame of image data.

Meanwhile, the bus control unit 4 receives the image data appended with the black-character portion information from the first image-data processing unit 3 and stores that data into the memory 8 via the CPU 7.

In addition, depending on the need of retrieving the image data appended with the black-character portion information for further processing, the MFP 1 also stores that data in the HDD 6. Moreover, the MFP 1 sends the image data appended with the black-character portion information from the memory 8 to the second image-data processing unit 5 via the CPU 7 and the bus control unit 4.

Figure 5:
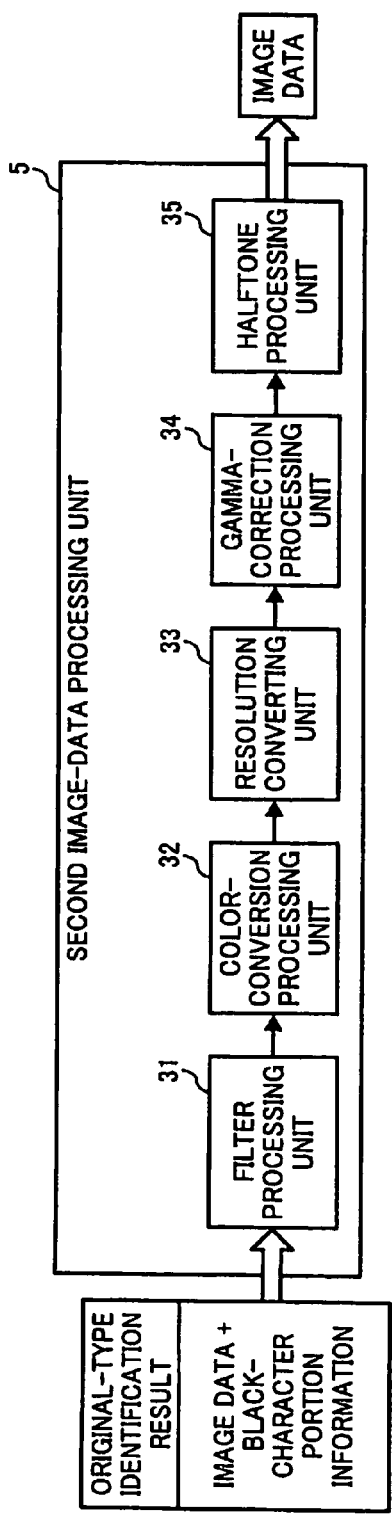
FIG. 5 is a block diagram of an exemplary configuration of a second image-data processing unit in the MFP.
Figure 6:
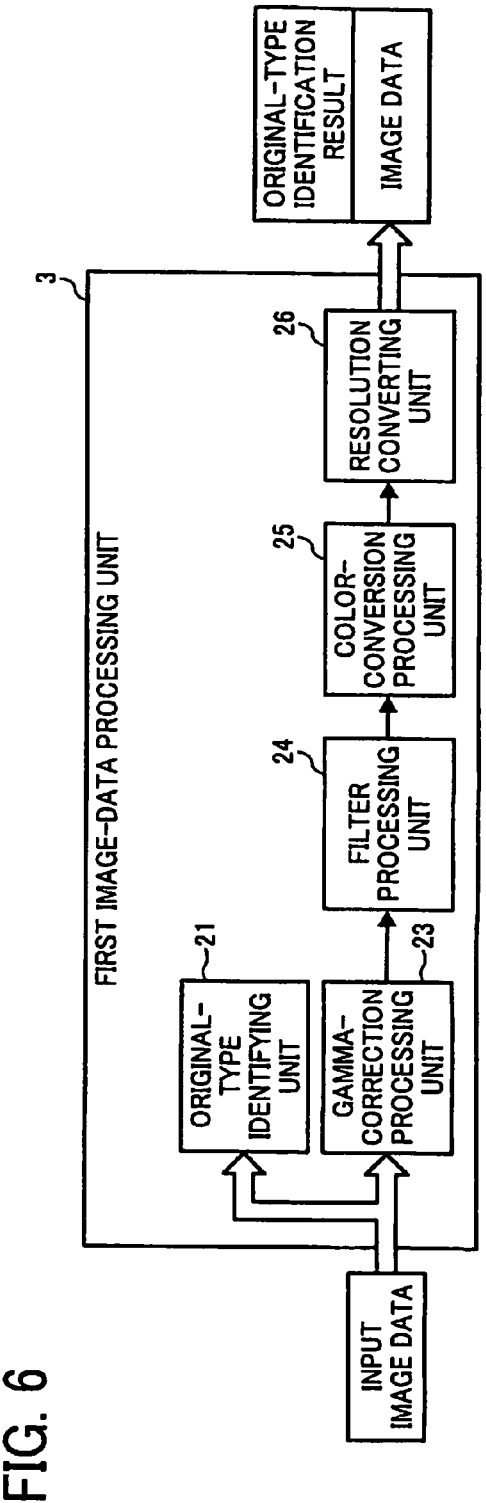
FIG. 6 is a block diagram of another configuration of the first image-data processing unit.

FIG. 5 is a block diagram of an exemplary configuration of the second image-data processing unit 5. As shown in FIG. 5, the second image-data processing unit 5 includes a filter processing unit 31, a color-conversion processing unit 32, a resolution converting unit 33, a gamma-correction processing unit 34, and a halftone processing unit 35. The filter processing unit 31 receives the image data appended with the black-character portion information and corresponding original-type identification result from the memory 8.

Subsequently, the filter processing unit 31 performs sharpness correction or signal-to-noise (S/N) ratio correction of the received RGB image data. That enhances the reproducibility of the image data before being output to the plotter unit 10. More particularly, depending on an image processing mode (a user-specified mode or a default mode) of the MFP 1, the filter processing unit 31 performs sharpening or smoothing of the image data. For example, in a character processing mode that focuses only on characters in an image, the filter processing unit 31 performs sharpening of characters in the image; while in a photo processing mode that focuses on pictures in an image, the filter processing unit 31 performs smoothing to ensure smoother gradation of the image.

The color-conversion processing unit 32 receives the predetermined bits (e.g., 8 bits) of RGB image data processed by the filter processing unit 31 and converts the image data into, e.g., 8 bits of CMYK, which is a suitable color space for the plotter unit 10. More particularly, when an automatic color output mode is selected as the color mode of the MFP 1, then the color-conversion processing unit 32 follows the original-type identification result obtained from the first image-data processing unit 3 and, if the original-type identification result indicates a color original, performs color conversion to reproduce image data in CMYK color space; while, if the original-type identification result indicates a monochrome original, performs color conversion to reproduce image data in black. Moreover, when a color output mode is selected as the color mode of the MFP 1, then the color-conversion processing unit 32 performs color conversion to reproduce image data in CMYK color space; while when a monochrome output mode is selected as the color mode of the MFP 1, the color-conversion processing unit 32 performs color conversion to reproduce image data in black. Furthermore, with respect to pixel data identified as black characters in the black-character portion information, the color-conversion processing unit 32 performs color conversion to reproduce pixel data in black irrespective of the color mode of the MFP 1.

The resolution converting unit 33 converts the resolution of the CMYK image data to a resolution suitable for the plotter unit 10. Thus, e.g., if the plotter unit 10 can output an image at 600 dpi and if the resolution converting unit 26 in the first image-data processing unit 3 has already converted the resolution to 600 dpi, then the resolution converting unit 33 does not perform resolution conversion.

The gamma-correction processing unit 34 converts the gamma characteristics of the CMYK image data according to the process characteristics of the plotter unit 10.

The halftone processing unit 35 receives the 8-bit CMYK image data from the gamma-correction processing unit 34 and performs halftone processing of the image data according to the gradation processing capacity of the plotter unit 10. For example, the halftone processing unit 35 performs halftone processing on 2-bit CMYK image data by using an error diffusion technique, which is one of the pseudo halftone processing techniques, and sends the halftone-processed 2-bit CMYK image data to the bus control unit 4.

The bus control unit 4 stores the image data processed by the second image-data processing unit 5 in the memory 8 via the CPU 7.

Meanwhile, the MFP 1 is configured to read an image processing program, which is used to implement an image processing method according to the embodiment, from a computer-readable recording medium, install the image processing program in the ROM 15 or the HDD 6, and execute the image processing program for implementing the image processing method. By implementing the image processing method, it is possible to enhance image quality at low image forming cost when more than one page of image data is output on a single page in a combined manner. The image processing program is a computer-executable program written in a legacy programming language or an object-oriented programming language (e.g., assembler language, C language, C++ language, c# language, and Java (registered trademark) language) and can be stored in a computer-readable recording medium for distribution. The computer-readable recording medium can be a ROM, an electrically erasable and programmable read only memory (EEPROM), an erasable and programmable read only memory (EPROM), a flash memory, a flexible disk, a compact disk read only memory (CD-ROM), a compact disk rewritable (CD-R), a digital video disk (DVD), an SD card, a magneto-optical (MO) disk, or the like.

Thus, the MFP 1 is configured to perform image output control whereby image quality can be enhanced at low image forming cost when more than one page of image data is output on a single page in a combined manner.

Given below is the description of various image processing operations and a process of combining image data performed in the MFP 1.

<Photocopying of Scanned Image Data>

Given below is the description of a photocopying process in which the plotter unit 10 prints image data read by the reading unit 2. First, the user sets an original in the reading unit 2, and inputs an image processing mode and photocopying instructions from the operation display unit 11.

The operation display unit 11 converts the user-specified information into control command data of the MFP 1 and sends the control command data to the CPU 7 via the expansion bus 17 of PCI-Express standard. Based on the control command data about starting the photocopying process, the CPU 7 executes a photocopying process program and performs necessary settings for photocopying.

During the photocopying process, first, the reading unit 2 reads images from the set original and outputs the images as, e.g., 8-bit RGB image data to the first image-data processing unit 3. In the first image-data processing unit 3, each of the gamma-correction processing unit 23, the filter processing unit 24, the color-conversion processing unit 25, and the resolution converting unit 26 performs image processing of the image data received from the reading unit 2 whereby the processed image data possesses predetermined characteristics. The black-character identifying unit 22 identifies portions of black characters from the image data and appends black-character portion information to the image data. The original-type identifying unit 21 obtains original-type identification result from the image data. The first image-data processing unit 3 sends the image data appended with the black-character portion information to the bus control unit 4.

More particularly, in the first image-data processing unit 3, the gamma-correction processing unit 23 performs gamma correction of the received image data and converts the image data from having characteristics based on reflectivity property to have predetermined gamma characteristics. The filter processing unit 24 performs predetermined filter processing on gamma-corrected image data and corrects MTF characteristics of the reading unit 2 to predetermined characteristics. The color-conversion processing unit 25 converts the color space of the reading unit 2 to a predetermined color space. The resolution converting unit 26 converts the resolution of the received image data to a predetermined resolution of, e.g., 600 dpi. The first image-data processing unit 3 sends the processed image data appended with the black-character portion information the to the bus control unit 4.

The bus control unit 4 stores the image data appended with the black-character portion information into the memory 8 via the CPU 7. The MFP 1 sends the image data appended with the black-character portion information from the memory 8 to the second image-data processing unit 5 via the CPU 7 and the bus control unit 4.

The second image-data processing unit 5 converts the RGB image data appended with the black-character portion information into CMYK image data suitable for the plotter unit 10. More particularly, first, the filter processing unit 31 in the second image-data processing unit 5 performs sharpness correction or S/N ratio correction of the RGB image data. That enhances the reproducibility of the image data before being output to the plotter unit 10. The color-conversion processing unit 32 receives the 8-bit RGB image data processed by the filter processing unit 31 and converts the image data into, e.g., 8-bit CMYK image data suitable for the plotter unit 10. That is, when the automatic color output mode is selected as the color mode of the MFP 1, then the color-conversion processing unit 32 follows the original-type identification result obtained from the first image-data processing unit 3 and, if the original-type identification result indicates a color original, performs color conversion to reproduce image data in CMYK color space; while, if original-type identification result indicates a monochrome original, performs color conversion to reproduce image data in black. Moreover, when the color output mode is selected as the color mode of the MFP 1, then the color-conversion processing unit 32 performs color conversion to reproduce image data in CMYK color space; while when the monochrome output mode is selected as the color mode of the MFP 1, then the color-conversion processing unit 32 performs color conversion to reproduce image data in black. Furthermore, with respect to pixel data identified as black characters in the black-character portion information, the color-conversion processing unit 32 performs color conversion to reproduce pixel data in black irrespective of the color mode of the MFP 1. Subsequently, the resolution converting unit 33 converts the resolution of the CMYK image data to the resolution (e.g., 600 dpi) suitable for the plotter unit 10. The gamma-correction processing unit 34 converts the gamma characteristics of the CMYK image data according to the process characteristics of the plotter unit 10. The halftone processing unit 35 receives the 8-bit CMYK image data from the gamma-correction processing unit 34 and performs halftone processing of the image data according to the gradation processing capacity of the plotter unit 10. For example, the halftone processing unit 35 performs halftone processing on 2-bit CMYK image data by using an error diffusion technique, which is one of the pseudo halftone processing techniques, and sends the halftone-processed 2-bit CMYK image data to the bus control unit 4.

The bus control unit 4 stores the CMYK image data in the memory 8 via the CPU 7. Then, the CPU 7 sends the CMYK image data in the memory 8 to the plotter unit 10 via the plotter I/F unit 9.

Based on the CMYK image data, the plotter unit 10 performs an electrophotographic process and outputs images on a recording medium such as paper or film to generate a photocopy of the original read by the reading unit 2.

Meanwhile, the MFP 1 can also be configured to perform data compression/data expansion as necessary to ensure efficient data transmission via a bus or efficient data storage in the HDD 6.

<Facsimile Transmission of Scanned Image Data>

Given below is the description of a facsimile transmission process in which image data read by the reading unit 2 is subjected to facsimile transmission via the line I/F unit 12. First, the user sets an original in the reading unit 2, specifies a destination for facsimile transmission, and inputs an image processing mode and facsimile transmission instructions from the operation display unit 11.

The operation display unit 11 converts the user-specified information into control command data of the MFP 1 and sends the control command data to the CPU 7 via the expansion bus 17 of PCI-Express standard. Based on the control command data about starting the facsimile transmission process, the CPU 7 executes a facsimile transmission program and performs necessary settings for facsimile transmission.

During the facsimile transmission process, first, the reading unit 2 reads images from the set original and outputs the images as, e.g., 8-bit RGB image data to the first image-data processing unit 3. In the first image-data processing unit 3, each of the gamma-correction processing unit 23, the filter processing unit 24, the color-conversion processing unit 25, and the resolution converting unit 26 performs image processing of the image data received from the reading unit 2 whereby the processed image data possesses predetermined characteristics. The black-character identifying unit 22 identifies portions of black characters from the image data and appends black-character portion information to the image data. The original-type identifying unit 21 obtains original-type identification result from the image data. The first image-data processing unit 3 sends the image data appended with the black-character portion information to the bus control unit 4.

The bus control unit 4 stores the image data appended with the black-character portion information into the memory 8 via the CPU 7. In addition, depending on the need of retrieving the image data appended with the black-character portion information for further processing, the MFP 1 also stores that data in the HDD 6.

Moreover, the MFP 1 sends the image data appended with the black-character portion information from the memory 8 to the second image-data processing unit 5 via the CPU 7 and the bus control unit 4. The second image-data processing unit 5 refers to the black-character portion information and converts the image data into monochrome two-value image data suitable for facsimile transmission. More particularly, the filter processing unit 31 in the second image-data processing unit 5 performs sharpness correction of the received RGB image data to enhance its reproducibility for facsimile transmission. That is, the filter processing unit 31 performs sharpening or smoothing of the image data depending on a desired image processing mode. For example, in the character processing mode, the filter processing unit 31 performs sharpening of characters in the image; while in the photo processing mode, the filter processing unit 31 performs smoothing to ensure smoother gradation of the image. The color-conversion processing unit 32 receives the 8-bit RGB image data processed by the filter processing unit 31 and converts the image data into 8-bit monochrome image data, which is the type of image data generally used in facsimile transmission. However, if the destination for facsimile transmission (facsimile device FX) is compatible to color facsimiles, then the color-conversion processing unit 32 performs color conversion similar to that described above in the photocopying process. More particularly, when the automatic color output mode is selected as the color mode of the MFP 1, the color-conversion processing unit 32 follows the original-type identification result obtained from the first image-data processing unit 3 and, if the original-type identification result indicates a color original, performs color conversion to reproduce image data in RGB color space; while, if the original-type identification result indicates a monochrome original, performs color conversion to reproduce image data in black (grayscale). Moreover, when the color output mode is selected as the color mode of the MFP 1, the color-conversion processing unit 32 performs color conversion to reproduce image data in RGB color space; while when the monochrome output mode is selected as the color mode of the MFP 1, the color-conversion processing unit 32 performs color conversion to reproduce image data in black (grayscale). Subsequently, the resolution converting unit 33 converts the resolution of the monochrome image data to a resolution suitable for the facsimile device FX. For example, the resolution converting unit 33 converts the resolution of the monochrome image data to 200 dpi in main scanning direction and 100 dpi in sub-scanning direction. The gamma-correction processing unit 34 then converts the gamma characteristics of the monochrome image data to enhance its reproducibility for facsimile transmission. For example, in the character processing mode, the gamma-correction processing unit 34 performs gamma correction with higher contrast to sharpen the characters in the image; while in the photo processing mode, the filter processing unit 31 performs relatively moderate gamma correction to ensure smoother gradation of the image. The halftone processing unit 35 receives the 8-bit monochrome image data from the gamma-correction processing unit 34 and performs halftone processing of the image data according to the gradation processing capacity of the plotter unit 10. For that, the halftone processing unit 35 uses an error diffusion technique, which is one of the pseudo halftone processing techniques, to obtain the monochrome two-value image data. However, in the case of color facsimile transmission, the halftone processing unit 35 outputs the 8-bit monochrome image data without performing the halftone processing.

The bus control unit 4 receives the monochrome two-value image data from the second image-data processing unit 5 and stores it in the memory 8 via the CPU 7. Subsequently, the bus control unit 4 sends the monochrome two-value image data from the memory 8 to the line I/F unit 12, which in turn sends the monochrome two-value image data to the facsimile device FX via the telephone line.

<Scanner Distribution of Scanned Image Data>

Given below is the description of a scanner distribution process in which image data read by the reading unit 2 is sent to the external device. First, the user sets an original in the reading unit 2, and inputs an image processing mode and scanner distribution instructions from the operation display unit 11.

The operation display unit 11 converts the user-specified information into control command data of the MFP 1 and sends the control command data to the CPU 7 via the expansion bus 17 of PCI-Express standard. Based on the control command data about starting the scanner distribution process, the CPU 7 executes a scanner distribution program and performs necessary settings for scanner distribution.

During the scanner distribution process, first, the reading unit 2 reads images from the set original and outputs the images as, e.g., 8-bit RGB image data to the first image-data processing unit 3. In the first image-data processing unit 3, each of the gamma-correction processing unit 23, the filter processing unit 24, the color-conversion processing unit 25, and the resolution converting unit 26 performs image processing of the image data received from the reading unit 2 whereby the processed image data possesses predetermined characteristics. The black-character identifying unit 22 identifies portions of black characters from the image data and appends black-character portion information to the image data. The original-type identifying unit 21 obtains original-type identification result from the image data. The details of the image processing performed in the first image-data processing unit 3 are identical to those described in the photocopying process.

The bus control unit 4 receives the image data appended with the black-character portion information from the first image-data processing unit 3 and stores it into the memory 8 via the CPU 7. In addition, depending on the need of retrieving the image data appended with the black-character portion information for further processing, the bus control unit 4 can also store that data in the HDD 6.

The MFP 1 sends the RGB image data appended with the black-character portion information from the memory 8 to the second image-data processing unit 5 via the CPU 7 and the bus control unit 4. The second image-data processing unit 5 converts the received RGB image data into a format suitable for scanner distribution (e.g., RGB multivalued image data, grayscale image data, or monochrome two-value image data) and output the converted image data to the bus control unit 4.

More particularly, the filter processing unit 31 in the second image-data processing unit 5 performs sharpness correction of the received RGB image data to enhance its reproducibility for scanner distribution. That is, the filter processing unit 31 performs sharpening or smoothing of the image data depending on the specified image processing mode. For example, in the character processing mode, the filter processing unit 31 performs sharpening of characters in the image; while in the photo processing mode, the filter processing unit 31 performs smoothing to ensure smoother gradation of the image. The color-conversion processing unit 32 receives the 8-bit RGB image data processed by the filter processing unit 31 and converts the image data into, although not limited to, 8-bit image data in sRGB color space generally used for scanner distribution. However, in addition to distributing the image data in sRGB color space, it is also possible to distribute grayscale image data or monochrome two-value image data as described in the photocopying process and the facsimile transmission process, respectively. Thus, the color-conversion processing unit 32 can be configured to convert the image data into a suitable format according to the requirement. More particularly, when the automatic color output mode is selected as the color mode of the MFP 1, the color-conversion processing unit 32 follows the original-type identification result obtained from the first image-data processing unit 3 and, if the original-type identification result indicates a color original, performs color conversion to reproduce image data in sRGB color space; while, if the original-type identification result indicates a monochrome (B&W) original, performs color conversion to reproduce image data in black (grayscale). Moreover, when the color output mode is selected as the color mode of the MFP 1, the color-conversion processing unit 32 performs color conversion to reproduce image data in sRGB color space; while when the monochrome output mode is selected as the color mode of the MFP 1, the color-conversion processing unit 32 performs color conversion to reproduce image data in black (grayscale). Subsequently, the resolution converting unit 33 converts the resolution of the image data in sRGB color space to a resolution suitable for scanner distribution. For example, the resolution converting unit 33 converts the resolution of the image data in sRGB color space to 200 dpi in main scanning direction and 200 dpi in sub-scanning direction. The gamma-correction processing unit 34 then converts the gamma characteristics of the image data to enhance its reproducibility for scanner distribution. However, in the abovementioned case, because the image data is already color-matched to the sRGB color space, the gamma-correction processing unit 34 does not have to perform gamma correction. The halftone processing unit 35 receives the image data from the gamma-correction processing unit 34 and performs halftone processing suitable for the specified scanner distribution. However, e.g., if the image data is specified to be 16-million-color RGB image data, then the halftone processing unit 35 does not perform halftone processing.

The bus control unit 4 receives the image data from the second image-data processing unit 5 and stores it in the memory 8 via the CPU 7. Subsequently, the bus control unit 4 sends the image data from the memory 8 to the external I/F unit 13, which in turn sends the image data to the external device (e.g., a PC) via the network.

<Printing of Image Data Input Via External I/F Unit>

Given below is the description of a printing process in which the plotter unit 10 prints image data input via the external I/F unit 13.

In the case of printing image data stored in the external medium, first, the user attaches the external medium to the external-medium connecting unit 16 such that the external medium is connected with the external I/F unit 13. Then, the user inputs an image processing mode and printing instructions from the operation display unit 11. To instruct the printing of image data from the external device, the user inputs an image processing mode and printing instructions from the external device.

The external I/F unit 13 converts the user-specified information into control command data of the MFP 1 and sends the control command data to the CPU 7 via the expansion bus 17 of PCI-Express standard.

Based on the control command data about starting the printing process, the CPU 7 executes a printing process program and performs necessary settings for printing.

The MFP 1 receives digital image data based on an 8-bit RGB color space from the external medium or digital image data based on a rendered 8-bit RGB color space from the external device via the external I/F unit 13. The MFP 1 stores such image data with its original color space in the memory 8 via the CPU 7. Although a variety of standardized color spaces are available, sRGB color space and AdobeRGB color space are the commonly used color spaces.

If the received image data is in a color space other than standardized color spaces specified in the MFP 1, then the MFP 1 sends that image data from the memory 8 to the second image-data processing unit 5, instructs the second image-data processing unit 5 to convert the image data into the user-specified color space, and stores the converted image data back in the memory 8. Consider a case when the external device performs rendering of image data before sending the rendered image data to the MFP 1 for printing. In that case, the external device also performs original type identification with respect to the image data by using a software program and appends the original-type identification result to the image data.

Meanwhile, depending on the need of retrieving the image data appended with black-character portion information for further processing, the MFP 1 can store that data in the HDD 6 along with the memory 8.

In the case of, e.g., photographic data of a digital camera, it is not possible to obtain the original-type identification result in advance. In that case, the original-type identification result can be obtained at the time of receiving image data via the external I/F unit 13 by instructing the CPU 7 to execute a software process of original type identification or by installing a new hardware block for original type identification. However, such a measure takes identify processing time with respect to each frame of the image data. Particularly, the software process of original type identification executed by the CPU 7 reduces the productivity of the MFP 1. Thus, if productivity of the MFP 1 is an issue, then image processing can be performed under the assumption that the original-type identification result always indicates a color original.

Similarly, while rendering the image data, the external device can also perform black character identification with respect to the image data by using a software program and append black-character portion information to the image data. In the case of common print data, a character object in black color is considered as a black character. When it is not possible to obtain in advance the black-character portion information for photographic data of a digital camera, then the black-character portion information can be obtained at the time of receiving image data via the external I/F unit 13 by instructing the CPU 7 to execute a software process of black character identification or by installing a new hardware block for black character identification.

Figure 7:
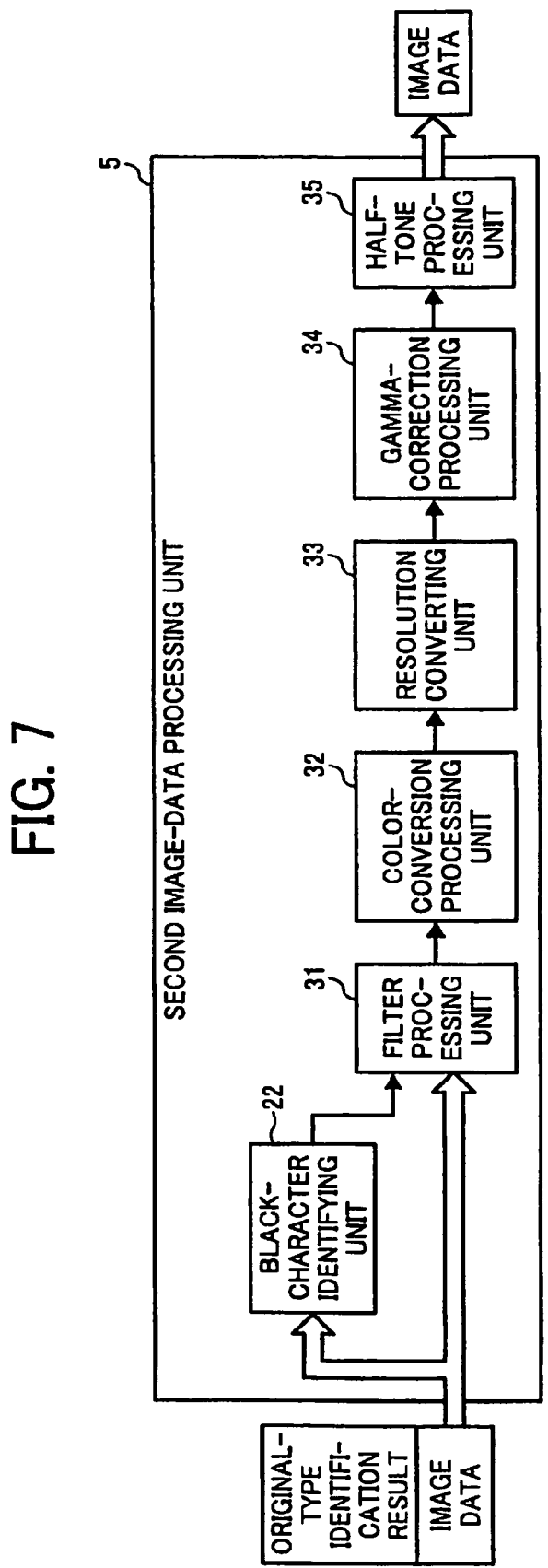
FIG. 7 is a block diagram of another configuration of the second image-data processing unit.

To perform black character identification with respect to the image data received via the external I/F unit 13, the black-character identifying unit 22 can be removed from the first image-data processing unit 3 (see FIG. 6) and included in the second image-data processing unit 5 (see FIG. 7).

The second image-data processing unit 5 shown in FIG. 7 receives image data stored in the memory 8 or in the HDD 6 via the bus control unit 4. Subsequently, the black-character identifying unit 22 identifies portions of black characters from the image data and outputs the black-character portion information to the filter processing unit 31. Based on the black-character portion information, the filter processing unit 31 performs sharpening or smoothing of the image data depending on a desired image processing mode. For example, in the character processing mode, the filter processing unit 31 performs sharpening of characters in the image; while in the photo processing mode, the filter processing unit 31 performs smoothing to ensure smoother gradation of the image.

In this way, black character identification is performed after retrieving the image data from the memory 8 or the HDD 6. Thus, there is no need to store the black-character portion information in the memory 8. However, if irreversible compression/expansion is used to store the image data in the memory 8, then there is a possibility of deterioration in the image quality thereby affecting the accuracy of black character identification.

Meanwhile, the software process of black character identification executed by the CPU 7 reduces the productivity of the MFP 1. Thus, if productivity of the MFP 1 is an issue, then the process of black character identification can be skipped and image processing can be performed under the assumption that there are no black characters in the image data.

The MFP 1 sends the RGB image data in a standardized color space and the corresponding black-character portion information from the memory 8 to the second image-data processing unit 5 via the CPU 7 and the bus control unit 4. The second image-data processing unit 5 refers to the black-character portion information, converts the image data into CMYK image data suitable for printing, and sends the converted image data to the bus control unit 4. The details of the image processing performed in the second image-data processing unit 5 are identical to those described in the photocopying process.

The bus control unit 4 stores the CMYK image data in the memory 8 via the CPU 7. Then, the CPU 7 sends the CMYK image data in the memory 8 to the plotter unit 10 via the plotter I/F unit 9.

Upon receiving the CMYK image data, the plotter unit 10 outputs images in the image data on a recording medium to generate a print image of the image data received from the external medium or the external device via the external I/F unit 13.

<Facsimile Transmission of Image Data Input Via External I/F Unit>

Given below is the description of a facsimile transmission process in which image data input via the external I/F unit 13 is subjected to facsimile transmission via the line I/F unit 12.

In the case of performing facsimile transmission of image data stored in the external medium, first, the user attaches the external medium to the external-medium connecting unit 16 such that the external medium is connected with the external I/F unit 13. Then, the user inputs an image processing mode and facsimile transmission instructions from the operation display unit 11. To instruct the facsimile transmission of image data from the external device, the user specifies a destination for facsimile transmission as well as and inputs an image processing mode and facsimile transmission instructions from the external device.

The operation display unit 11 or the external I/F unit 13 converts the user-specified information into control command data of the MFP 1 and sends the control command data to the CPU 7 via the expansion bus 17 of PCI-Express standard.

Based on the control command data about starting the facsimile transmission of image data input via the external I/F unit 13, the CPU 7 executes a facsimile transmission program and performs necessary settings for facsimile transmission.

The MFP 1 receives digital image data based on an 8-bit RGB color space from the external medium or digital image data based on a rendered 8-bit RGB color space from the external device via the external I/F unit 13. The MFP 1 stores such image data with its original color space in the memory 8 via the CPU 7.

Depending on the need of retrieving the image data appended with black-character portion information for further processing, the MFP 1 can store that data in the HDD 6 along with the memory 8.

The MFP 1 then sends the RGB image data in a standardized color space and the corresponding black-character portion information from the memory 8 to the second image-data processing unit 5 via the CPU 7 and the bus control unit 4.

The second image-data processing unit 5 refers to the black-character portion information, converts the image data into monochrome two-value image data suitable for facsimile transmission, and sends the monochrome two-value image data to the bus control unit 4.

The bus control unit 4 stores the monochrome two-value image data in the memory 8 via the CPU 7. Then, the CPU 7 sends the monochrome two-value image data from the memory 8 to the line I/F unit 12, which in turn sends the monochrome two-value image data to the facsimile device FX via the telephone line.

<Scanner Distribution of Image Data Input Via External I/F Unit>

Given below is the description of a scanner distribution process in which image data input via the external I/F unit 13 is sent to the external device via the external I/F unit 13. In the case of performing scanner distribution of image data stored in the external medium, first, the user attaches the external medium to the external-medium connecting unit 16 such that the external medium is connected with the external I/F unit 13. Then, the user inputs an image processing mode and scanner distribution instructions from the operation display unit 11. To instruct the scanner distribution of image data from the external device, the user inputs an image processing mode and scanner distribution instructions from the external device.

Based on control command data about starting the scanner distribution process, the CPU 7 executes a scanner distribution program and performs necessary settings for scanner distribution.

The MFP 1 receives digital image data based on an 8-bit RGB color space from the external medium via the external I/F unit 13 or receives digital image data for printing based on a rendered 8-bit RGB color space from the external device. The MFP 1 stores such image data with its original color space in the memory 8 via the CPU 7.

Depending on the need of retrieving the image data appended with black-character portion information for further processing, the MFP 1 can store that data in the HDD 6 along with the memory 8.

The MFP 1 then sends the RGB image data in a standardized color space and the corresponding black-character portion information from the memory 8 to the second image-data processing unit 5 via the CPU 7 and the bus control unit 4.

The second image-data processing unit 5 refers to the black-character portion information, converts the image data into a format suitable for scanner distribution (e.g., RGB multivalued image data, grayscale image data, or monochrome two-value image data), and outputs the converted image data to the bus control unit 4. The details of the image processing performed in the second image-data processing unit 5 are identical to those described in the scanner distribution process of image data read by the reading unit 2.

The bus control unit 4 stores the converted image data in the memory 8 via the CPU 7. Then, the CPU 7 sends the image data from the memory 8 to the external I/F unit 13, which in turn sends the image data to the external device (e.g., a PC) via the network.

In the abovementioned processes, the MFP 1 receives image data via the reading unit 2, the line I/F unit 12, or the external I/F unit 13 that functions as a data input unit. However, the abovementioned processes can also be performed with respect to image data stored in advance in the HDD 6 or the memory 8.

<Printing of Combined Image Data>

Given below is the description of a process of printing combined image data in which more than one page of image data is combined on a single page and printed on a recording medium. The image data to be combined can include image data read by the reading unit 2, image data received from the facsimile device FX via the line I/F unit 12, and image data received from the external medium or the external device via the external I/F unit 13. There are various ways of combining image data, namely, two-in-one output in which two pages of image data is combined on a single page, four-in-one output in which four pages of image data is combined on a single page, and eight-in-one output in which eight pages of image data is combined on a single page. The following description is given for a case of two-in-one output in which two A4-size pages of image data is combined on a single A4-size page.

Consider a case when scanned image data is subjected to two-in-one output. In that case, first, the reading unit 2 reads the image data from two A4-size originals. Then, the first image-data processing unit 3 and the second image-data processing unit 5 perform image processing of the image data from each original in an identical manner to the image processing described above in the photocopying process of scanned image data. The processed image data in both originals is stored in the memory 8 or the HDD 6.

Subsequently, by using the original-type identification result and the black-character portion information, the second image-data processing unit 5 performs image processing in an identical manner to the image processing described above in the photocopying process of scanned image data, or the facsimile transmission process of scanned image data, or the scanner distribution process of scanned image data.

Particularly, to combine two A4-size pages of image data on a single A4-size page, the resolution converting unit 33 in the second image-data processing unit 5 reduces the resolution of the image data by 50%. For example, the resolution converting unit 33 reduces the resolution of the two A4-size pages of image data from 600 dpi to 300 dpi.

The bus control unit 4 receives the two A4-size pages of image data with reduced resolution from the second image-data processing unit 5 and stores it in the memory 8 via the CPU 7. Subsequently, the bus control unit 4 loads the two A4-size pages of image data in a specific sequence in the memory 8 and sends it to the plotter unit 10 via the plotter I/F unit 9. The plotter unit 10 sequentially prints the two A4-size pages of image data on a recording medium to obtain an output image in two-in-one format.

As described above, to sequentially output the two A4-size pages of image data on a recording medium, one method is to load the image data in a specified sequence at consecutive addresses in the memory 8, sequentially read the image data from those addresses, and output the image data on the recording method. Another method is to read the image data from the memory 8 by controlling read addresses according to an output sequence and sequentially output the image data on the recording medium. In that case, the image data is read from the memory 8 according to the layout of the combined output.

Meanwhile, in addition to combining two A4-size pages of image data on a single A4-size paper, it is also possible to combine two A4-size pages of image data on a single A3-size paper. In that case, the two A4-size pages of image data can be arranged in its original form on the A3-size page. Hence, the resolution converting unit 33 in the second image-data processing unit 5 does not have to reduce the resolution of the image data. That is, the image data of 600 dpi on each of the two A4-size pages is output as it is on the A3-size page.

Meanwhile, for simplification purpose in the above description, image processing other than resolution conversion is not altered according to the type of combined output. However, to enhance the image quality, image processing such as filter processing or color conversion can be performed depending on resolution conversion processing.

Moreover, to improve data reusability of stored image data in the MFP 1, the image data is stored at read resolution in the memory 8 or the HDD 6. However, when more emphasis is placed on productivity of the MFP 1 than data reusability of stored image data, then resolution conversion processing can be performed entirely by the resolution converting unit 33 in the second image-data processing unit 5 or can be performed in a phased manner by using the combination of the resolution converting unit 26 in the first image-data processing unit 3 and the resolution converting unit 33 in the second image-data processing unit 5.

Figure 8:
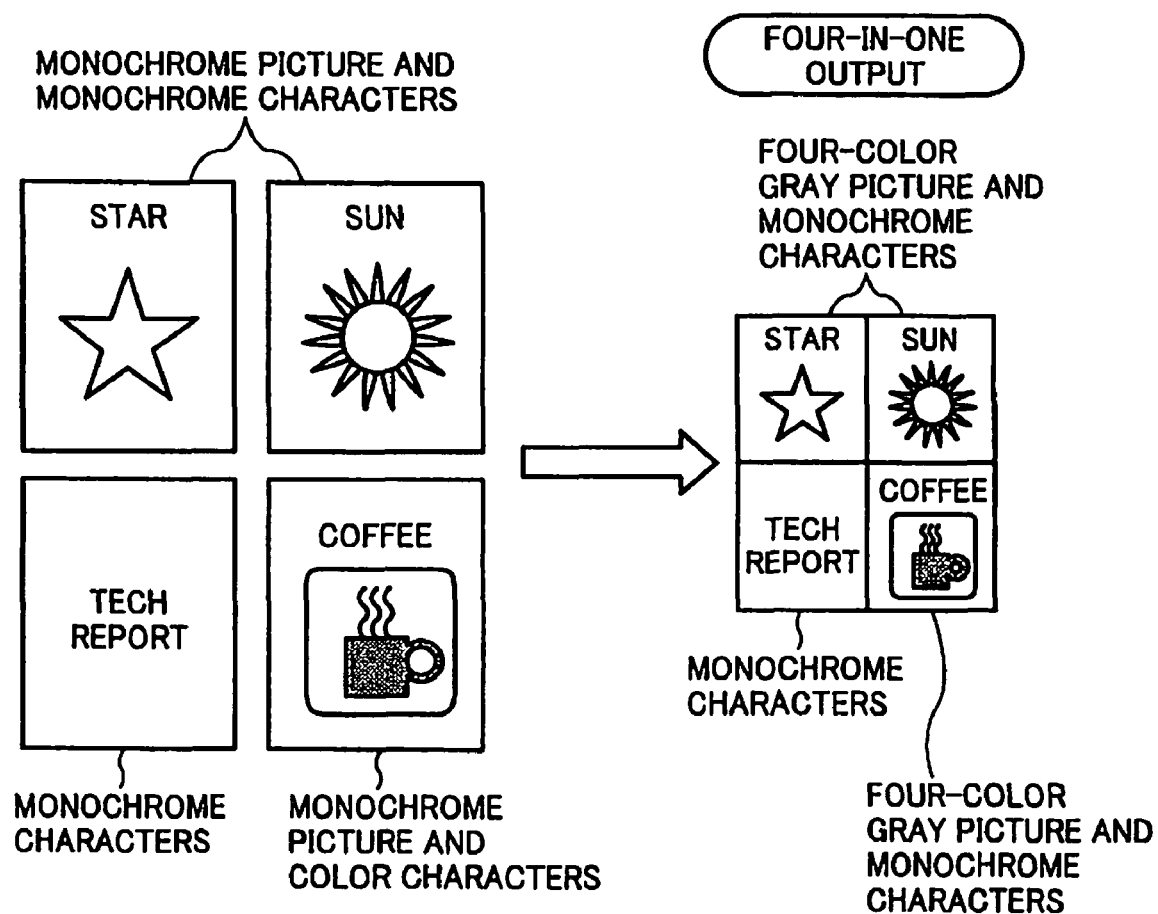
FIG. 8 is a diagram for explaining an exemplary four-in-one output for printing.

FIG. 8 is a diagram for explaining an exemplary four-in-one output for printing. As shown in FIG. 8, one original having image data of monochrome characters, two originals having image data of a monochrome picture and monochrome characters, and one original having image data of color characters and a monochrome picture are combined on a single page. In that case, the single page of combined image data includes one page of monochrome characters, two pages of a picture in grayscale using four colors and monochrome characters, and one page of a picture in grayscale using four colors and monochrome characters.

More particularly, in four-in-one output, the original-type identification result obtained by the original-type identifying unit 21 indicates that only the page having color characters (bottom right original in FIG. 8) is a color page, while the remaining three pages are monochrome pages.

Based on the original-type identification result, the first image-data processing unit 3 and the second image-data processing unit 5 perform image processing of the four pages of image data in an identical manner to the image processing described above in the photocopying process or the printing process. Subsequently, the four pages of image data is combined on a single page and output on a recording medium. If the image processing mode (a user-specified mode or a default mode) of the MFP 1 is a photo processing mode focusing on pictures in all of the image data, then, irrespective of the original-type identification result, the image data in the monochrome pages is subjected to color output. That is, in four-in-one output, based on the black-character portion information obtained by the black-character identifying unit 22, only the black characters in all of the image data are output in a monochrome manner. On the other hand, in the case of the monochrome pages, image data other than the black characters is output in grayscale using four colors.

Such a method of image reproduction is identical to reproducing a monochrome picture from a color page. As a result, images in the combined output have uniformity as well as enhanced image quality. Moreover, by reproducing the monochrome pages in grayscale using four colors, it is possible to improve image density, granularity, and gloss as compared to monochrome output. That helps in enhancing the image quality. Furthermore, because gray image reproduction is performed with CMYK color simulation, the image quality of reproduced image data is constant with the original monochrome color.

Moreover, because the black characters in the monochrome pages are output in a monochrome manner based on the black-character portion information, the problem of image quality deterioration such as toner scattering does not occur.

Meanwhile, although the above description is given for four-in-one output, the description is also applicable to other types of combined output.

If the specified image processing mode of the MFP 1 is not the photo processing mode focusing on pictures in image data, then image processing suitable to the specified image processing mode is performed. For example, consider a case when the specified image processing mode of the MFP 1 is a mode focusing on granularity in image data, or a mode focusing on gloss while outputting image data on a coated paper, or a mode focusing on reproducing image data on high-consistency recording medium such as developing paper. In that case, the image data in the monochrome pages is subjected to color output such that the combined image data has uniformity and enhanced image quality. On the other hand, if the specified image processing mode of the MFP 1 is a character processing mode focusing only on characters in image data, then image processing is performed according to the original-type identification result because there is no demand to enhance the image quality.

If there are mutually contradicting image processing modes with respect to the image data to be combined, then image processing is performed according to the original-type identification result.

When all the pages of image data to be combined are determined to be monochrome pages, then from the perspective of the uniformity of output images as well as lower image forming cost, monochrome output can be selected as the output mode.

<Facsimile Transmission or Distribution of Combined Image Data>

Given below is the description of a process of facsimile transmission of combined image data in which more than one page of image data is combined on a single page and subjected to facsimile transmission or distribution.

Figure 9:
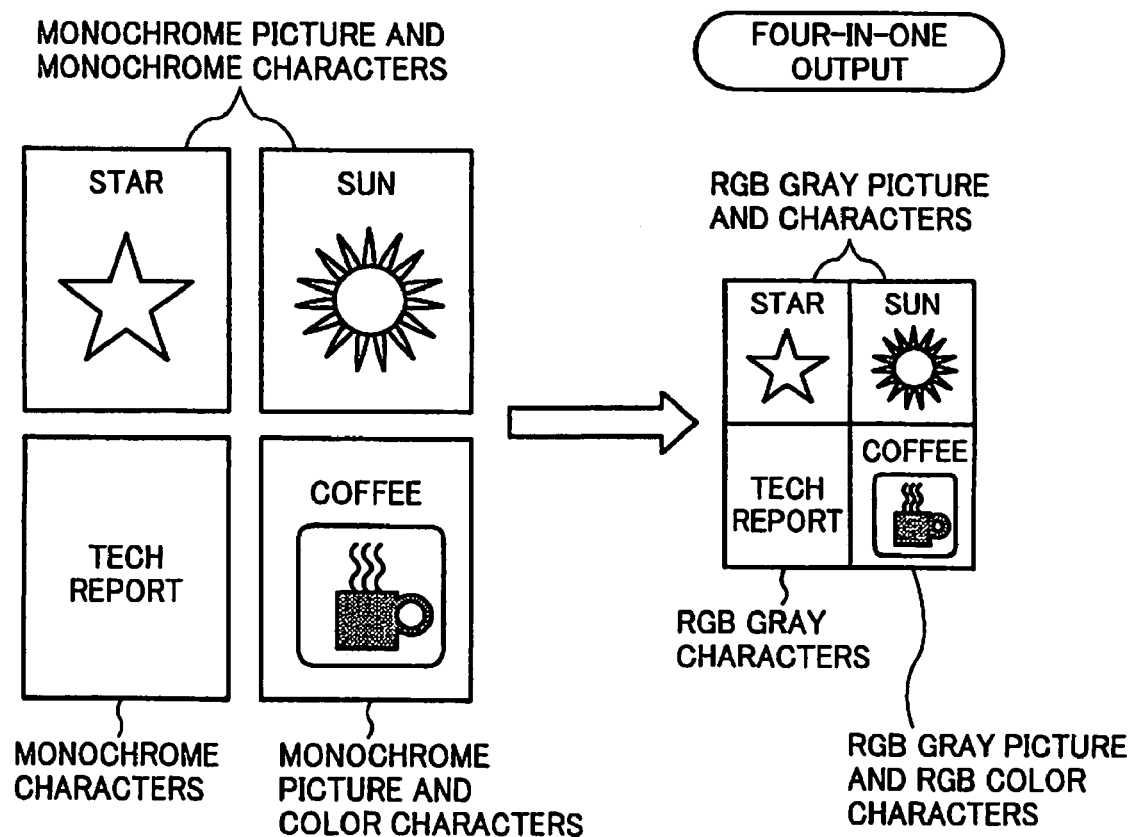
FIG. 9 is a diagram for explaining an exemplary four-in-one output for facsimile transmission or distribution.
Figure 10:
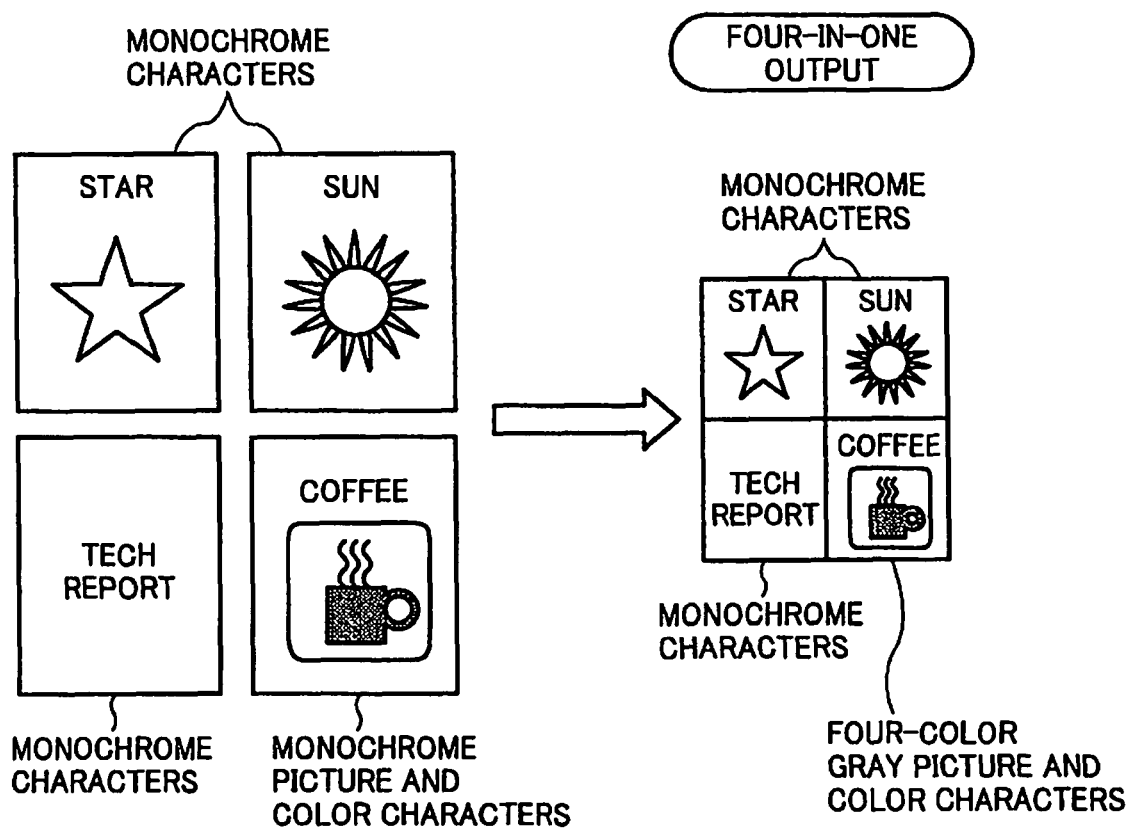
FIG. 10 is a diagram for explaining a conventional technique to combine three originals having monochrome characters and one original having color characters and a monochrome picture on a single page.
Figure 11:
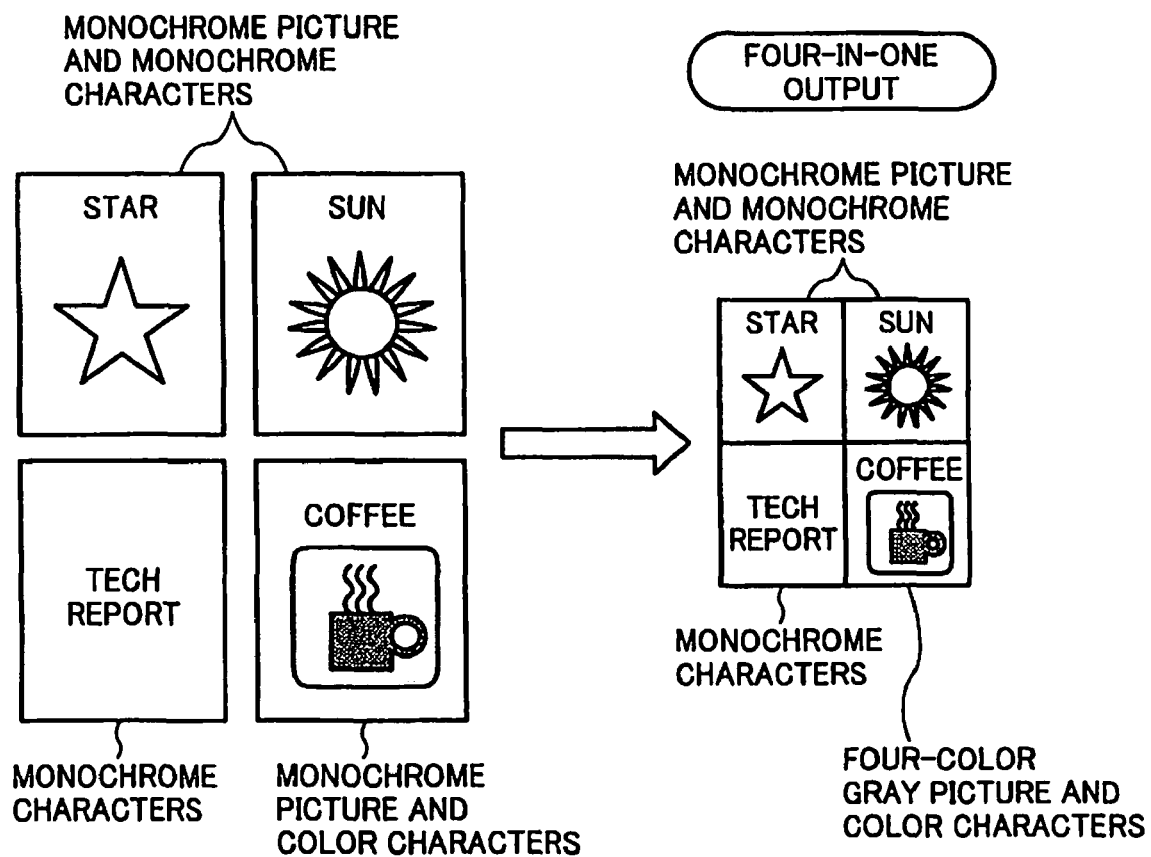
FIG. 11 is a diagram for explaining a conventional technique to combine one original having monochrome characters, two originals having a monochrome picture and monochrome characters, and one original having color characters and a monochrome picture on a single page.

FIG. 9 is a diagram for explaining an exemplary four-in-one output for facsimile transmission or distribution. As shown in FIG. 9, one original having image data of monochrome characters, two originals having image data of a monochrome picture and monochrome characters, and one original having image data of color characters and a monochrome picture are combined on a single page. In that case, the single page of combined image data includes one page of RGB gray characters, two pages of a RGB gray picture and RGB gray characters, and one page of a RGB gray picture and RGB color characters.

That is, similar to the description with reference to FIG. 8, the original-type identification result obtained by the original-type identifying unit 21 indicates that only the page having color characters (bottom right original in FIG. 9) is a color page, while the remaining three pages are monochrome pages.

Based on the original-type identification result, the first image-data processing unit 3 and the second image-data processing unit 5 perform image processing of the four pages of image data in an identical manner to the image processing described above in the facsimile transmission of scanned image data or the scanner distribution of scanned image data. Subsequently, the four pages of image data is combined on a single page and the single page of combined image data is subjected to facsimile transmission or distribution.

If the image processing mode (a user-specified mode or a default mode) of the MFP 1 is a photo processing mode focusing on pictures in all of the image data, then, irrespective of the original-type identification result, the image data in the monochrome pages is subjected to color output for color facsimile transmission. More particularly, in four-in-one output, based on the black-character portion information obtained by the black-character identifying unit 22, only the black characters in all of the image data are output in grayscale having equal values for R, G, and B. On the other hand, in the case of the monochrome pages, image data other than the black characters is output in grayscale by using color output. In that case, the RGB balance of the grayscale output is maintained identical to the RGB balance of the original image data. Such a method of image reproduction is identical to reproducing a monochrome picture from a color page. As a result, images in the combined output have uniformity as well as enhanced image quality. Moreover, even in the case of monochrome output, gray image reproduction is performed with RGB color simulation. As a result, the image quality of reproduced image data is maintained constant with the original monochrome color. Furthermore, the black characters are output in grayscale having equal values for R, G, and B based on the black-character portion information. As a result, a printer driver at the destination for facsimile transmission recognizes the characters in the combined image data as monochrome data and is able to print high-quality characters without any image quality deterioration such as toner scattering.

Meanwhile, although the above description is given for four-in-one output, the description is also applicable to other types of combined output.

If the specified image processing mode of the MFP 1 is not the photo processing mode focusing on pictures in image data, then image processing suitable to the specified image processing mode is performed to generate combined image data for facsimile transmission or distribution. For example, consider a case when the specified image processing mode of the MFP 1 is a mode focusing on granularity in image data, or a mode focusing on gloss while outputting image data on a coated paper, or a mode focusing on reproducing image data on high-consistency recording medium such as developing paper, or a mode focusing on exact monochrome reproduction of colors based on printer simulation or user registration. In that case, the image data in the monochrome pages is subjected to color output such that the combined image data for facsimile transmission or distribution has uniformity and enhanced image quality. On the other hand, if the specified image processing mode of the MFP 1 is a character processing mode focusing only on characters in image data, then image processing is performed according to the original-type identification result because there is no demand to enhance the image quality.

If there are mutually contradicting image processing modes with respect to the image data to be combined, then image processing is performed according to the original-type identification result to obtain image quality with uniformity.

When all the pages of image data to be combined are determined to be monochrome pages, then from the perspective of the uniformity of output images as well as lower image forming cost, monochrome output can be performed according to the original-type identification result.

In this way, the black-character identifying unit 22 identifies portions of black characters from each image to be combined. The color-conversion processing unit 25 and the color-conversion processing unit 32 perform color conversion (color conversion or monochrome conversion) with respect to the images to be combined and also convert the portions of black characters identified in each image into black color. More particularly, the original-type identifying unit 21 determines whether each image to be combined is a color image or a monochrome image and, if it is determined that the images to be combined include one or more color images, then color conversion is performed according to the specified image processing mode and the original-type identification result. Subsequently, the images subjected to color conversion are combined on a single page and output for printing, facsimile transmission, or distribution.

Such image processing enables high-quality reproduction of black characters as well as generation of high-quality combined image data at low image forming cost.

When the original-type identification result obtained by the original-type identifying unit 21 indicates that the images to be combined are monochrome images and when the images include characters, then it is desirable to output the combined images in monochrome. However, when the images include characters as well as pictures, it is desirable to output the pictures in grayscale using four colors for good image quality. Particularly, if at least one color image is present in the images to be combined, then the output in grayscale using four colors results in depiction of monochrome pictures in full color thereby giving a uniform tone to the combined output. That enhances the image quality of the combined output. Moreover, in that case, the monochrome characters are determined to be black characters and are output in monochrome. That enhances the quality of characters in the combined output.

Thus, even if the images to be combined are determined to be monochrome images, it is possible to obtain a uniform tone in the combined output as well as to obtain combined output in grayscale using four colors that has better image quality than monochrome reproduction as long as the image forming cost is not affected.

Generally, when the original-type identification result obtained by the original-type identifying unit 21 indicates that all the images to be combined are monochrome images, then monochrome output is selected as the output mode from the perspective of lower image forming cost. However, as long as the image forming cost is within limits, it is possible to use other output modes.

Moreover, unlike in the case of a conventional technology, there is no need to vary image processing parameters with respect to each image to be combined in the MFP 1. That enables to speed up the process of outputting combined image data.

Meanwhile, instead of performing by rule color conversion according to the original-type identification result obtained by the original-type identifying unit 21, the MFP 1 can be configured to display the page of combined image data on the user display of the operation display unit 11 such that the user can confirm the page and accordingly decide on the desired color conversion.

Such a configuration enables the MFP 1 to generate the combined image data in adherence to the user requirement.

If the image processing mode of the MFP 1 is a photo processing mode focusing on pictures in image data, then, irrespective of the original-type identification result obtained by the original-type identifying unit 21, the image data in the monochrome pages is subjected to color output.

Thus, if the user selects the photo processing mode, then the MFP 1 can generate high-quality combined image data with focus on pictures in adherence to the user requirement.

If the image processing mode of the MFP 1 is a character processing mode focusing only on characters in image data, then color conversion is performed according to the original-type identification result.

That enables enhancement in the image quality each image to be combined as well as generation of combined image data having sharp characters in adherence to the user requirement.

If the image processing mode of the MFP 1 is a mode focusing on any one of granularity, gloss, color reproducibility, and reproduction on high-consistency recording medium, then color output is performed irrespective of the original-type identification result.

That enables generation of high-quality combined image data in adherence to the user requirement.

Meanwhile, consider a case when the images to be combined include an image with respect to which it is not possible to determine an image processing mode and the original-type identifying unit 21 is unable to identify the type of the image. In that case, color conversion is performed based on the original-type identification result with respect to each image to be combined. That ensures appropriate image processing to generate the combined image data.

If it is assumed that image processing is performed by rule according to the original-type identification result and irrespective of the image processing mode, then it becomes necessary to reset the parameters in the second image-data processing unit 5 each time the original-type identification result changes from a color original to a monochrome original, and vice versa. At each time of resetting the parameters, it is necessary to perform mode determination or register setting. That reduces the productivity of the MFP 1.

However, although the MFP 1 determines whether the originals to be combined includes at least one color original, the image processing in the MFP 1 is performed to obtain identical image quality at each image processing mode. Thus, there is no need to switch between image processing for a color original and image processing for a monochrome original. That improves the productivity of the MFP 1.

Meanwhile, when image data is combined for facsimile transmission or distribution, it is necessary to output the combined image data in a single image format, which is not the case when image data is combined for photocopying.

For that, the combined image data is reproduced in grayscale having equal values for R, G, and B based on the original-type identification result. However, if the combined image data includes a color image, then the combined image data is output in a color image format. In other words, only when all the images in the combined image data are monochrome images, the combined image data is output in a monochrome image format.

Moreover, in the case of color facsimile transmission, it is possible to output the combined image data in color image format. However, in the case of conventional monochrome facsimile transmission, the combined image data is converted to grayscale even if the combined image data includes a color image.

According to one aspect of the present invention, it is possible to reproduce black characters of high quality as well as output high-quality combined image data at low image forming cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus having a plurality of image processing modes and outputting images of a plurality of pages on a single page in a combined manner, the image processing apparatus comprising:
    an image determining unit that determines whether each of the images is a color image or a monochrome image;
    a character identifying unit that identifies a black character area in each of the images;
    a color-conversion processing unit that performs either one of a color conversion and a monochrome conversion on each of the images and a monochrome conversion on the black character area;
    a mode identifying unit that identifies a current image processing mode;
    a control unit that, when the image determining unit determines that the images include a color image, controls the color-conversion processing unit to perform the color conversion on the images based on a result of determination by the image determining unit and the current image processing mode; and
    an image output unit that combines the images on which the color conversion is performed by the color-conversion processing unit on a single page and outputs combined images,
    wherein when the current image processing mode is a mode based on a picture area, granularity, glossiness, color reproducibility, or high-density-area reproducibility, the control unit controls the color-conversion processing unit to perform the color conversion on the images, other than the black character area in each of the images, regardless of the result of determination by the image determining unit.

2. The image processing apparatus according to claim 1, wherein when the current image processing mode is a mode emphasizing a character area, the control unit controls the color-conversion processing unit to perform the color conversion on the images based on the result of determination by the image determining unit.

3. The image processing apparatus according to claim 1, wherein when the images include an image for which the mode identifying unit is unable to identify the current image processing mode and the image determining unit is unable to determine whether the image is a color image or a monochrome image, the control unit controls the color-conversion processing unit to perform the color conversion based on the result of determination by the image determining unit for each of the images.

4. A method of outputting images of a plurality of pages on a single page in a combined manner, the method comprising:
    determining whether each of the images is a color image or a monochrome image;
    identifying a black character area in each of the images;
    performing either one of a color conversion and a monochrome conversion on each of the images and a monochrome conversion on the black character area;
    identifying a current image processing mode;
    causing, when it is determined that the images include a color image at the determining, the color conversion to be performed on the images based on a result of determination at the determining and the current image processing mode; and
    image outputting including combining the images on which the color conversion is performed on a single page and outputting combined images,
    wherein when the current image processing mode is a mode based on a picture area, granularity, glossiness, color reproducibility, or high-density-area reproducibility, the causing includes causing the color conversion to be performed on the images, other than the black character area in each of the images, regardless of the result of determination at the determining.

5. The method according to claim 4, wherein when the current image processing mode is a mode emphasizing a character area, the causing includes causing the color conversion to be performed on the images based on the result of determination at the determining.

6. The method according to claim 4, wherein when the images include an image for which the current image processing mode can hardly be identified at the identifying and whether the image is a color image or a monochrome image can hardly be determined at the determining, the causing includes causing the color conversion to be performed based on the result of determination at the determining for each of the images.

7. A computer program product comprising a non-transitory computer-usable medium having computer-readable program codes embodied in the medium for outputting images of a plurality of pages on a single page in a combined manner, the program codes when executed causing a computer to execute:

determining whether each of the images is a color image or a monochrome image;

identifying a black character area in each of the images;

performing either one of a color conversion and a monochrome conversion on each of the images and a monochrome conversion on the black character area;

identifying a current image processing mode;

causing, when it is determined that the images include a color image at the determining, the color conversion to be performed on the images based on a result of determination at the determining and the current image processing mode; and image outputting including combining the images on which the color conversion is performed on a single page and outputting combined images, wherein when the current image processing mode is a mode based on a picture area, granularity, glossiness, color reproducibility, or high-area-density reproducibility, the causing includes causing the color conversion to be performed on the images, other than the black character area in each of the images, regardless of the result of determination at the determining.

8. The computer program product according to claim 7, wherein when the current image processing mode is a mode emphasizing a character area, the causing includes causing the color conversion to be performed on the images based on the result of determination at the determining.

9. The computer program product according to claim 7, wherein when the images include an image for which the current image processing mode can hardly be identified at the identifying and whether the image is a color image or a monochrome image can hardly be determined at the determining, the causing includes causing the color conversion to be performed based on the result of determination at the determining for each of the images.

* * * * *